United States Patent [19]

Hofstetter

[11] 4,204,734

[45] May 27, 1980

[54] EXPOSURE CONTROL SYSTEM FOR PHOTOGRAPHIC COPYING MACHINES

[75] Inventor: Franz Hofstetter, Herbertshausen, Fed. Rep. of Germany

[73] Assignee: AGFA-Gevaert Aktiengesellschaft, Leverkusen, Fed. Rep. of Germany

[21] Appl. No.: 872,620

[22] Filed: Jan. 26, 1978

[30] Foreign Application Priority Data

Jan. 28, 1977 [DE] Fed. Rep. of Germany ....... 2703415

[51] Int. Cl.² .......................................... G03B 27/78
[52] U.S. Cl. ........................................ 355/68; 355/83
[58] Field of Search ............................. 355/38, 68, 83; 356/175, 202, 203, 443, 444, 404; 250/562, 563

[56] References Cited

U.S. PATENT DOCUMENTS 3,222,983 12/1965 Ouchi ...................................... 355/68

Primary Examiner—L. T. Hix
Assistant Examiner—W. J. Brady
Attorney, Agent, or Firm—Peter K. Kontler

[57] ABSTRACT

The exposure control of a photographic copying machine has several detectors which are exposed to surrounding light as well as to original-modulated copying light to transmit first signals which denote the color composition and/or density of originals. The influence of surrounding light upon the first signals is compensated for by discrete circuits which generate and store second signals corresponding to those portions of first signals which are attributable to the influence of surrounding light upon the respective detectors. The second signals are subtracted from first signals during exposure of an original to copying light whereby the resulting third signals denote the color composition and/or density of the original as if the detectors were not exposed to surrounding light.

11 Claims, 2 Drawing Figures

EXPOSURE CONTROL SYSTEM FOR PHOTOGRAPHIC COPYING MACHINES

BACKGROUND OF THE INVENTION

The present invention relates to photographic copying machines in general, and more particularly to improvements in photographic copying machines of the type wherein the platform which supports an original during copying is not shielded from surrounding light and the copying is regulated by automatic exposure controls. Still more particularly, the invention relates to photographic copying machines wherein the color- and/or density-monitoring detector means of the exposure controls are located outside of the path of copying light and face the illuminated original.

Copying machines of the above outlined character are used primarily for the making of reproductions of discrete originals or for the reproduction of images of differently dimensioned and/or configurated originals. As a rule, the originals are placed onto and removed from the platform by an attendant. This renders it necessary to install the platform in such a way that it is readily accessible for positioning and removal of originals. In order to allow for accurate evaluation of color composition and/or density of an original, certain presently known copying machines embody an opaque glass plate which shields a freshly inserted original and the detector means from surrounding light (including daylight and/or light furnished by one or more room-illuminating light sources) to thus insure accurate measurements of color distribution and/or density of the original preparatory to the making of one or more reproductions. It is also known to employ a bellows which extends between the platform and the detector means when the original is ready for copying. Such bellows serve the same purpose as the aforementioned opaque plates, i.e., they shield the detectors from surrounding light during evaluation of the freshly inserted original so that the signal or signals transmitted by the detector means are sufficiently accurate to insure the making of satisfactory reproductions.

The opening or closing of bellows and the movement of a plate-like or otherwise configurated shielding device to and from operative position takes up a substantial amount of time. Moreover, the presence of such shielding means invariably reduces, at least to a certain extent, the accessibility of the platform.

OBJECTS AND SUMMARY OF THE INVENTION

An object of the invention is to provide a photographic copying machine wherein the detector means of the automatic exposure controls need not be shielded from surrounding light, not even during the interval of evaluation of the density and/or color composition of an original in or on the platform.

Another object of the invention is to provide a novel and improved exposure control system for use in photographic copying machines of the above outlined character.

A further object of the invention is to provide an exposure control system whose detector means can remain exposed to surrounding light during evaluation of one or more characteristics of an original prior to exposure of the original to copying light.

An additional object of the invention is to provide the exposure control system with a novel and improved circuit which compensates for the fact that the detector means is not shielded from surrounding light during evaluation of one or more characteristics of an original which is about to be copied.

The invention is embodied in a photographic copying machine wherein successive originals are exposed to copying light during imaging onto photosensitive material, and more particularly in an exposure control system for use in such copying machines. The exposure control system comprises at least one detector having an output which transmits a first electric signal denoting the color composition and/or density of an original and a photosensitive portion which is permanently exposed to surrounding light (including daylight and/or artificial light in the room where the machine is set up), which faces the original to be copied and which is located outside of the path of propagation of original-modulated copying light toward the photosensitive material (e.g., toward the emulsion on a web of photographic paper). The exposure control system further comprises a compensating circuit including means for generating and storing a second signal corresponding to that portion of the first signal which is attributable to the influence of surrounding light upon the photosensitive portion of the detector and means for subtracting the second signal from the first signal during exposure of an original to copying light so that the resulting third signal denotes the color composition and/or density of the original as if the detector were not exposed to surrounding light.

The subtracting means preferably includes a first differential amplifier (e.g., an amplifier having a high ohmic resistance, low noise and relatively high offset voltage) whose negative input is connected to the output of the detector and whose output transmits the third signal. The negative input of the first amplifier is connectable with the output of a second differential amplifier whose positive input is connected to the output of the first amplifier. The means for connecting the negative input of the first amplifier with the output of the second amplifier preferably includes an electronic switch which is closed prior to exposure of an original to copying light and is open during exposure of such original to copying light. When the switch is closed, it further connects the output of the second amplifier with a capacitor which stores the second signal and is connected to the negative input of the first amplifier by way of a resistor. The capacitor discharges in response to opening of the switch, i.e., when the original is exposed to copying light.

The characteristics of the second amplifier are preferably just the opposite of the characteristics of the first amplifier, i.e., the second amplifier (which may constitute a chopper amplifier) exhibits a low ohmic resistance, high noise and a relatively low offset voltage.

An advantage of the improved exposure control system is that the detector can remain exposed to surrounding light prior to as well as during exposure of originals to copying light and that the signals furnished to other constituents of the exposure control system are not distorted or otherwise affected by the fact that the detector is not shielded from surrounding light.

The novel features which are considered as characteristic of the invention are set forth in particular in the appended claims. The improved copying machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
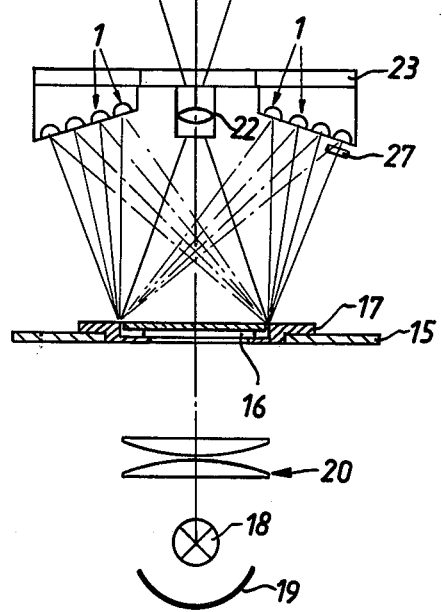
FIG. 1 is a fragmentary schematic partly sectional view of a photographic copying machine which embodies the invention.

FIG. 1 shows a portion of a photographic copying machine which includes a platform or support 15 for an original 16, a mask 17 which is mounted in, on or adjacent to the platform 15 to determine that part of the image on the original 16 which is to be exposed to copying light, a source 18 of copying light, a reflector 19 and an optical system 20 which directs copying light against one side of the original 16. The platform 15 is readily accessible for locating an original 16 in requisite position between the optical system 20 and the mask 17, as well as for convenient replacement of such original with a fresh original having the same or a different size and/or shape.

The original 16 is imaged onto photographic paper 21 by an objective 22 which is located in the path of copying light issuing from the source 18 and passing through the original and mask 17. The objective 22 is mounted on a holder 23 which further carries two batteries of photoelectric detectors 1. The light-sensitive surfaces of the detectors 1 face the original 16 and are exposed to surrounding light as well as to copying light. The rays of copying light which impinge upon the detectors 1 are indicated by phantom lines.

The photographic paper 21 is shown in the form of a roll which is paid out by a supply reel 24 and collected by a takeup reel 25. A second mask 26 determines that portion or frame of photographic paper which is exposed to copying light issuing from the source 18 in the course of an exposure. The mask 17 and/or 26 is exchangeable and/or adjustable to enhance the versatility of the copying machine.

The detectors 1 are assumed to monitor the color composition of originals. Each of these detectors is located behind a suitable filter (one shown at 27) which permits the passage of blue, green or red light. It is further assumed that the base material of detectors 1 is silicon whose spectral sensitivity in the red and green bands is higher than in the blue band. Therefore, the exposure control comprises several detectors 1 for determination of the basic color blue.

Each battery of detectors 1 is assumed to consist of five discrete detectors including three detectors which are exposed to blue light, one detector for red light and one detector for green light. The voltages transmitted by the outputs of all detectors for a given color are totalized and transmitted to an evaluating circuit. A discrete evaluating circuit is provided for each of the three basic colors.

Figure 2:
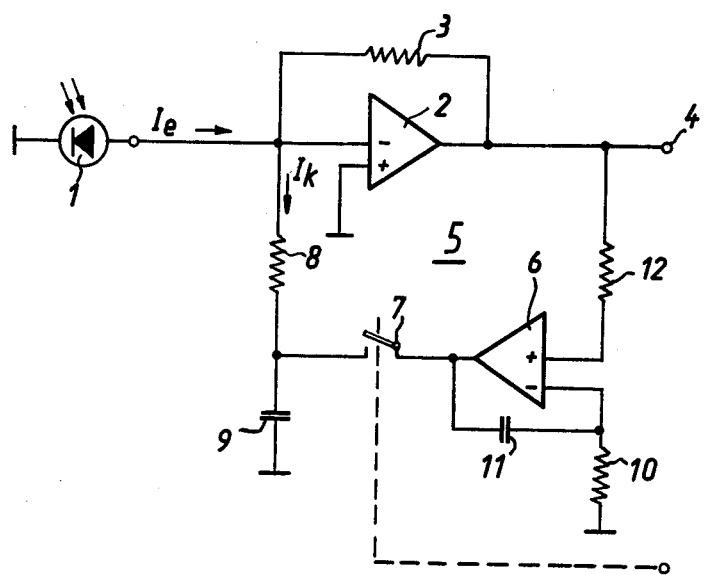
FIG. 2 is a circuit diagram of one of the improved compensating circuits in the copying machine of FIG. 1.

FIG. 2 shows a detector 1 which is preferably a silicon photodiode whose cathode is grounded and whose anode is connected to the negative input of a differential amplifier 2. The output of the amplifier 2 is connected to the negative input by a feedback conductor including a resistor 3. Furthermore, the output of the amplifier 2 is connected to the output terminal 4 of the compensating circuit. The terminal 4 receives signals whose magnitude is indicative of the measured light in the particular color.

The output of the differential amplifier 2 is also connected to the negative input by way of a control loop 5 which comprises a second differential amplifier 6, a switch 7 and a resistor 8. The output of the second differential amplifier 6 is connected with one contact of the switch 7 so that it is connected with one plate of a capacitor 9 in response to closing of the switch 7. The other plate of the capacitor 9 is grounded. The positive input of the amplifier 2 is grounded, and the negative input of the amplifier 6 is connected to the ground by way of a resistor 10. A capacitor 11 is connected between the negative input and the output of the amplifier 6. For the purposes of symmetry, the positive input of the amplifier 6 is connected with the output of the amplifier 2 by a resistor 12. The resistor 8 is connected between the negative input of the amplifier 2 and the one plate of the capacitor 9.

Since the photocurrent $I_e$ furnished by the detector 1 is very small (in the range of a few picoamperes), the ohmic resistance of the input of the amplifier 2 must be high. Therefore, the amplifier 2 is preferably of the type having a bipolar FET-input. However, such amplifiers normally exhibit a high offset voltage (e.g., in the range of 1 mv). The other amplifier 6 is preferably a low-drift and low-offset unit, e.g., a chopper amplifier whose offset voltage is merely in the range of 40 $\mu v$.

The switch 7 is preferably an electronic switch, e.g., an FET-transistor. This switch can open in automatic response to completion of the circuit of the source 18 of copying light. The parts 8, 9 together constitute a time-delay unit of the compensating circuit.

The operation is as follows:

The copying operation can be said to consist of two stages, namely a first stage during which a suitable advancing mechanism (e.g., a mechanism including a pair of intermittently driven rolls) transports the paper web 21 lengthwise to place a fresh frame into register with the objective 22 and during which the original 16 is replaced with a fresh original (certain other manipulations, too, can take place during the first stage), and a second stage which involves the actual copying operation including determination of the color contents of the original 16 on the platform 15.

The switch 7 is closed during the first stage but is open during the second stage. Furthermore, the heat seal of the lamp housing is closed during the first stage and the illumination filters are in operative positions.

The detector 1 is exposed to surrounding light during the first stage of a copying operation. During the second stage, the detector 1 is exposed to surrounding light as well as to copying light which issues from the source 18 and passes through the original 16. During the first stage, the short-circuit current at the output of the detector 1 is converted (by amplifier 2 and resistor 3) into voltage $-U_A = (I_e - I_k) \cdot R$, wherein $U_A$ is the output voltage at the terminal 4, $I_e$ is the short-circuit current furnished by the output of the detector 1, $I_k$ is the current flowing through the resistor 8, and R is the resistance of the resistor 3.

The differential amplifier 6 of the control loop 5 constitutes essentially a compensating amplifier. The control loop 5 compensates for the photocurrent $I_e$ by supplying a negative current $I_k$ (via resistor 8) to the inverting input of the differential amplifier 2. The output voltage of the amplifier 2 is thereby reduced to a small residual voltage, namely, the offset voltage of the second differential amplifier 6. At the same time, the photocurrent which is induced by the surrounding light is stored in the capacitor 9.

The stage 2 begins in response to opening of the switch 7 which results in storing of compensating voltage in the capacitor 9. During exposure to copying light, the photocurrent $I_e$ is indicative of surrounding light as well as of object-modulated copying light. The capacitor 9 discharges via resistor 8 and supplies a negative current to the negative input of the amplifier 2 to thus eliminate that share of the output signal which is attributable to exposure of the detector 1 to surrounding light.

The resistance of the resistor 8 determines the extent of compensation for the intensity of surrounding light. The capacitance of the capacitor 9 determines the interval of storage. If the resistance of the resistor 8 is approximately 470 M$\Omega$ and the capacitance of the capacitor 9 is approximately 4.7 $\mu$F, the time constant is approximately 2,100 seconds. If the maximum exposure time is 10 seconds, the compensating current $I_k$ is reduced by 0.5 percent, namely to a value $I_k \cdot I_e - (10/2100)$. The exposure time error is reduced by the ratio of copying light to surrounding light.

The capacitor 11 restricts the band width of the differential amplifier 6. This is desirable for the formation of an average value of the undulation of surrounding light which, in the case of customary artificial illumination of the room, is chopped with 100 hertz.

The improved compensating circuit and the aforediscussed special characteristics of the differential amplifiers 2 and 6 entail a combination of positive characteristics of these amplifiers so that they constitute a photoamplifier whose ohmic resistance is high, whose noise is low and which is practically free of drift. The combined amplifier compensates for drift as well as for the base current at the input.

Furthermore, the two differential amplifiers together constitute a photoamplifier having a high dynamic range and which retains the zero point for long intervals of time without any adjustments. As mentioned above, the relatively high drift of offset voltage at the output of the amplifier 2 (which is assumed to have a bipolar FET input) is compensated for by the chopper-stabilized second amplifier 6 which also compensates for the photocurrent induced by surrounding light.

It will be seen that the improved circuit includes means for electronically compensating for surrounding light to which the detectors 1 are exposed. Therefore, the room in which the copying machine is installed need not be a dark room and the light in the room need not be extinguished during exchange of originals in spite of the fact that the detectors 1 need not be shielded at any stage of the copying operation and/or during the intervals between successive copying operations. This facilitates the work of the operator, i.e., the intervals of idleness of the copying machine between the copying of successive originals are reduced to a fraction of those which are required in conventional copying machines employing bellows and/or other shielding means for the detectors. This is important since the length of intervals of idleness between successive operations of a semiautomatic copying machine depends primarily on the time which the operator requires to remove the copied original and to replace the removed original with a fresh original. In other words, the output of a semiautomatic copying machine can be greatly increased by reducing the time which the operator requires for such manipulation of copied and about-to-be-copied originals. This is rendered possible by the advent of the present invention which allows for exposure of detectors 1 to surrounding light during all stages of operation and manipulation, i.e., regardless of whether the copying light 18 is on or off.

As mentioned above, the improved arrangement brings about a pronounced reduction of drift of amplifier means for the photocurrent. Furthermore, the photocurrent which is furnished by the detectors 1 is shifted into the linear portion of the characteristic curve when the intensity of copying light is low.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. In a photographic copying machine wherein successive originals are exposed to copying light during imaging onto photosensitive material, exposure control means including at least one detector having an output for transmission of a first electric signal attributable to the influence of surrounding light while the copying light is turned off and a second signal attributable to the influence of surrounding light and the color composition and/or density of an original while the copying light is on, said detector including a photosensitive portion exposed to surrounding light, facing the original and located outside of the path for propagation of original-modulated copying light toward the photosensitive material; and a compensating circuit including means for storing said first signal while the copying light is off, and means for subtracting said stored first signal from said second signal during exposure of an original to copying light so that the resulting third signal denotes the color composition and/or density of the original as if said detector were not exposed to surrounding light.

2. In a photographic copying machine wherein successive originals are exposed to copying light during imaging onto photosensitive material, exposure control means including at least one detector having an output for transmission of a first electric signal denoting the color composition and/or density of an original, said detector including a photosensitive portion exposed to surrounding light, facing the original and located outside of the path for propagation of original-modulated copying light toward the photosensitive material; and a compensating circuit including means for generating and storing a second signal corresponding to that portion of said first signal which is attributable to the influence of surrounding light upon said photosensitive portion, and means for subtracting said second signal from said first signal during exposure of an original to copying light so that the resulting third signal denotes the color composition and/or density of the original as if said detector were not exposed to surrounding light, said subtracting means including a first differential amplifier having an inverting input connected with the output of said detector and an output for said third signal, and control means including a second differential amplifier having an input connected with the output of said first amplifier and an output connected with said inverting input, said storing means including a time-delay unit connected between the output of said second amplifier and said inverting input.

3. Exposure control means as defined in claim 2, wherein said time-delay unit includes capacitor means and said compensating circuit further includes means for connecting the output of said second amplifier to said capacitor means prior to exposure of an original to copying light.

4. Exposure control means as defined in claim 3, wherein said connecting means includes a switch which is open during exposure of an original to copying light.

5. Exposure control means as defined in claim 4, wherein said switch is an electronic switch.

6. Exposure control means as defined in claim 5, wherein said switch is an FET-transistor.

7. Exposure control means as defined in claim 2, wherein said first amplifier is a low-noise amplifier having a high ohmic resistance and a relatively high offset voltage.

8. Exposure control means as defined in claim 7, wherein said second amplifier is a high-noise amplifier having a low ohmic resistance and a minute offset voltage.

9. Exposure control means as defined in claim 2, wherein said inverting input is a bipolar FET input.

10. Exposure control means as defined in claim 9, wherein said second amplifier is a chopper amplifier.

11. Exposure control means as defined in claim 2, wherein said second amplifier has a second input which is negative, said compensating circuit further comprising capacitor means connected between said negative input and the output of said second amplifier.

* * * * *